(12) United States Patent
Rudigier

(10) Patent No.: US 6,934,432 B1
(45) Date of Patent: Aug. 23, 2005

(54) SWITCH FOR THE OPTICAL SWITCHING OF A LIGHT PATH

(75) Inventor: Helmut Rudigier, Bad Ragaz (CH)

(73) Assignee: Unaxis Balzers Aktiengesellschaft, Fuerstentum (LI)

( * ) Notice: Subject to any disclaimer, the term of this patent is extended or adjusted under 35 U.S.C. 154(b) by 559 days.

(21) Appl. No.: 09/594,170

(22) Filed: Jun. 15, 2000

(30) Foreign Application Priority Data

Jun. 14, 2000 (DE) ........................ 200 10 594.9

(51) Int. Cl.⁷ .................. G02B 6/35; G02B 26/08; G02B 7/182; G02B 5/08
(52) U.S. Cl. .................. 385/16; 385/18; 359/225; 359/840; 359/872
(58) Field of Search .................. 359/223, 225, 359/226, 840, 871, 872, 880, 881; 385/16, 18, 25, 26

(56) References Cited

U.S. PATENT DOCUMENTS

| 4,408,831 | A | * | 10/1983 | Sakaguchi et al. ........... 359/223 |
| 4,878,729 | A | | 11/1989 | Stewart |
| 5,059,779 | A | * | 10/1991 | Krichever et al. ...... 235/462.22 |
| 5,420,946 | A | * | 5/1995 | Tsai ............................... 385/22 |
| 5,436,986 | A | * | 7/1995 | Tsai ............................... 385/16 |
| 5,868,482 | A | | 2/1999 | Edlinger et al. |
| 6,059,416 | A | * | 5/2000 | Choi et al. .................. 359/850 |
| 6,275,626 | B1 | * | 8/2001 | Laor ............................ 385/18 |
| 6,310,737 | B1 | * | 10/2001 | Gillich et al. ............... 359/883 |
| 6,498,870 | B1 | * | 12/2002 | Wu et al. ...................... 385/18 |

FOREIGN PATENT DOCUMENTS

EP 0695954 A1 * 7/1996 ............ G02B/5/08

* cited by examiner

Primary Examiner—Akm Enayet Ullah
Assistant Examiner—Omar Rojas
(74) Attorney, Agent, or Firm—Crowell & Moring LLP

(57) ABSTRACT

A switch for the optical switching of a light path, particularly for switching the entering of light into a fiber-optical light guide is provided. The switch dial has at least one mirror surface for reflecting the light and, for establishing the mirror surface, a support is equipped with a reflective layer, which support is constructed as a glass body.

31 Claims, 5 Drawing Sheets

SWITCH FOR THE OPTICAL SWITCHING OF A LIGHT PATH

The invention relates to a switch for the optical switching of a light path, particularly for switching the entering of light into a fiber-optical light guide, the switch having at least one mirror surface for reflecting the light, for establishing the mirror surface, a support being equipped with a reflective layer.

A switch of the initially mentioned type is used particularly in glass fiber communication technology. Such a component permits a switching-over from a light-guiding to a different fiber and is normally activated mechanically, particularly swivelled.

Switches of this type therefore permit the reflecting of light, which exits from a light-guiding fiber, into a selectable different fiber. The reflection takes place by a mirror which is movable and should have a high reflection capacity, so that the deficiencies of light caused by the reflection are minimized. The mirrors are usually plane.

For implementing extremely branched networks, which can be arbitrarily configured, many such switches are required. It is therefore particularly important in this case that such switches can be produced at low manufacturing costs and that deficiencies of light occurring at the switches are as low as possible. Otherwise these deficiencies of light could add up to a considerable total loss of light in a network. In this case, the deficiency of light in the area of the switch depends not only on the quality of the used mirror but also on the size of the switch and the resulting mutual spacing of the light-guiding fibers between which a switching operation is to take place. The smaller the mutual spacing of the fibers, the lower the deficiencies in this area. As mentioned above, low deficiencies are important particularly in an optical communication network because, especially if switches are cascaded, it is necessary to amplify the signal which, in turn, leads to high costs. This situation of a possible deficiency of light and the possibly required amplification is in principle also not changed by the conventional use of lens systems in such networks, particularly of so-called GRIN lenses, thus lenses with a graded index with a well-defined power profile, which focus the light onto the cross-section of the light-guiding fiber.

Conventionally, switches of the initially mentioned type are often made in one piece from a light metal, such as aluminum. The use of light metal ensures that no large masses must be moved as the switch body. The mirror surfaces can be worked out of the material, preferably on both sides, in that a plane mirror surface is established in an area of the switch and is, for example, highly polished. In this case, the mirror surface must be particularly well made, that is, it must be plane and of a low surface roughness in order to avoid light scatter losses, particularly since generally fairly small mirrors are made having, for example, typical dimensions of 3×3×10 mm or less. In this case, the cross-sections of the light-guiding fibers are also relatively small and the fibers must be hit by the reflecting light in a precise manner. Thus, the manufacturing of such mirrors requires relatively high-expenditure metal-working process, such as diamond turning, in order to achieve the required surface quality and surface precision. However, this makes the manufacturing of the mirror relatively expensive and may also increase the rate of rejects. A poorly manufactured mirror will therefore result in the discarding of the whole switch body from which the mirror is machined out.

In addition, the light-metal material which, also with respect to costs, is well suited for manufacturing precise mirrors, may be less well suited for also achieving a mechanically reliable switching operation and a certain mechanical stability, particularly while its size is as small as possible.

From U.S. Patent Document U.S. Pat. No. 4,878,729, a switch of the above-mentioned type is known, in the case of which the mirror surfaces are applied to a support which is correspondingly coated. For this purpose, the support is coated by the electrolytic depositing of chrome. The important areas of the switch body are preferably made of plastic material by injection molding. It was found that the reflection capability is not perfect.

It is an object of the invention to provide a switch of the above-mentioned type which can be produced at reasonable cost and in a small size and can nevertheless be optimized optically and, with respect to its switching operation, particularly mechanically.

According to the invention, this object is achieved in that the support for the reflective layer is a glass body.

It is an advantage of the invention that, by means of known polishing methods, high-quality glass surfaces can be produced at reasonable cost, in which case, for example, a mean linear roughness of <0.01 mm can easily be achieved. Furthermore, by means of developed known processes, such a glass body can be provided very precisely with a highly reflective, optically very good mirror layer.

A further development of the invention provides that the glass body carrying the at least one mirror surface is cut as a mirror element out of a glass plate provided with at least one reflective layer. The reason is that, by means of the conventional glass polishing methods, also larger glass surfaces can advantageously be produced in a high-quality manner with low surface roughness, can be polished and subsequently coated with the reflective layer. In this fashion, the surface can therefore be achieved by a larger number of mirror elements of a constant homogeneous quality. The corresponding mirror elements can then be cut out of a thus fabricated glass plate, for example, in a sufficiently precise manner by means of notching and breaking or, for example, by means of a wafering saw.

In particular, a high-expenditure metal working for producing the mirror elements according to the invention can be completely eliminated.

The glass plate or the glass body can preferably be provided on both sides with a reflective layer, which can easily be achieved without major manufacturing expenditures. In this case, the mirror element can act as a switching element on both sides, for example, in a crossing point of several fibers or fiber-optical light guides.

According to the invention, another advantage is the fact that the mirror element can be produced in a very small size so that the spaces between various fibers can also be minimized in the switch area in order to avoid deficiencies of light in this manner. The glass plate and the glass body may, for example, have a thickness of approximately 0.02 to 0.7 mm, particularly of approximately 0.1 to 0.5 mm. In metal machining, such a small thickness would create major problems during the manufacturing and also with respect to the subsequent stability. In particular, the mirror itself must naturally also not distort over time as a result of the mechanical stressing by the switching operations. In contrast, a glass body ensures absolute stability also with the above-mentioned small thickness and maintains the once adjusted orientation. The reflective layer can be applied to the support by means of a vacuum coating method known per se, for example, by vaporizing or sputtering.

According to the invention, a highly reflective layer system is applied, preferably using gold, silver or aluminum. In addition, the reflective layer can be protected by a protective layer. In particular, stable hard dielectric oxides, nitrides or fluorides can be used for such a protective layer, particularly if they can be produced as a protective layer by means of vacuum techniques. $SiO_2$, $SiO_x$, $MgF_2$ and $ThF_4$ are particularly useful.

Another advantage of the switch according to the invention consists of the fact that the mirror element produced in the above-described manner can be produced as a separate part with an optically optimized quality, and can subsequently be arranged as a finished part on a separately constructed switch body which, in turn, has been optimized with respect to the mechanical demands. For its swivellability, the switch body may, for example, have a shaft or a shaft bore.

The switch body can be made of a material, such as plastic or metal, which can be cast or sprayed, particularly injection-molded.

In particular, the switch body may have an essentially cuboid construction; an axis of rotation can in this case be oriented by a principal axis of inertia of this cuboid. The mirror element may be arranged in a recess of this switch body on one side flush with the surface or may be introduced in a form-locking manner, for example, at a medium depth in a slot of this body. In both cases, the mirror element can project in a lug-type manner from the switch body. In particular, this projecting, relatively thin area can be inserted between the mutually spaced fibers 80 that the mutual spacing of the fibers can be correspondingly small, while the switch body nevertheless has a stable construction and bearing.

The mirror element can preferably be glued to the switch body, in which case glues which are known per se can be used, particularly UV-hardening glues. A gluing technique is described, for example, in U.S. Patent Document U.S. Pat. No. 5,868,482.

Embodiments illustrating additional inventive characteristics are shown in the drawing.

DETAILED DESCRIPTION OF THE DRAWINGS

Figure 1A:
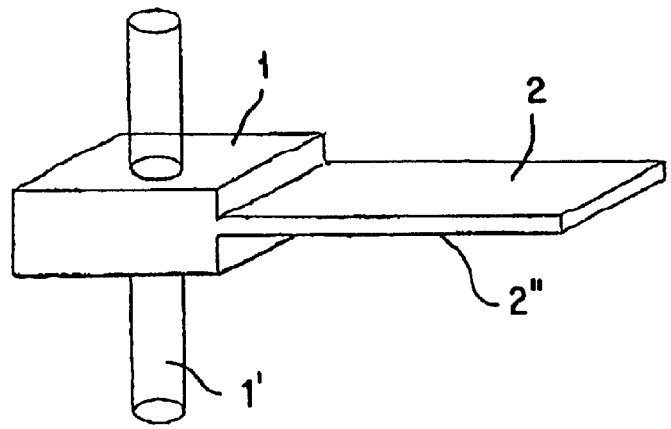
FIG. 1a is a view of a first embodiment of a switch from the prior having a one-piece mirror element and a switch body.
Figure 1B:
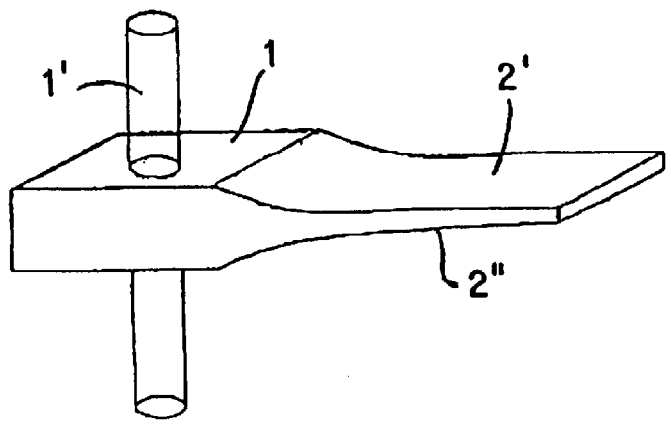
FIG. 1b is a view of a second one-piece embodiment from the prior art.

FIGS. 1a and 1b are schematic perspective views of possible embodiments of conventional switches of the above-mentioned type. A characteristic of these conventional switches is particularly that the reflecting surfaces 2', 2" are worked by means of material machining, preferably metal working, in one piece from the material, from which the switch body 1 itself is also made with its rotating shaft 1'.

As a result, the manufacturing of such a conventional switch requires relatively high expenditures and cost but simultaneously is not optimized optically and/or mechanically and results in a relatively large size. Particularly light metal, such as aluminum, can be used as the material.

Figure 2A:
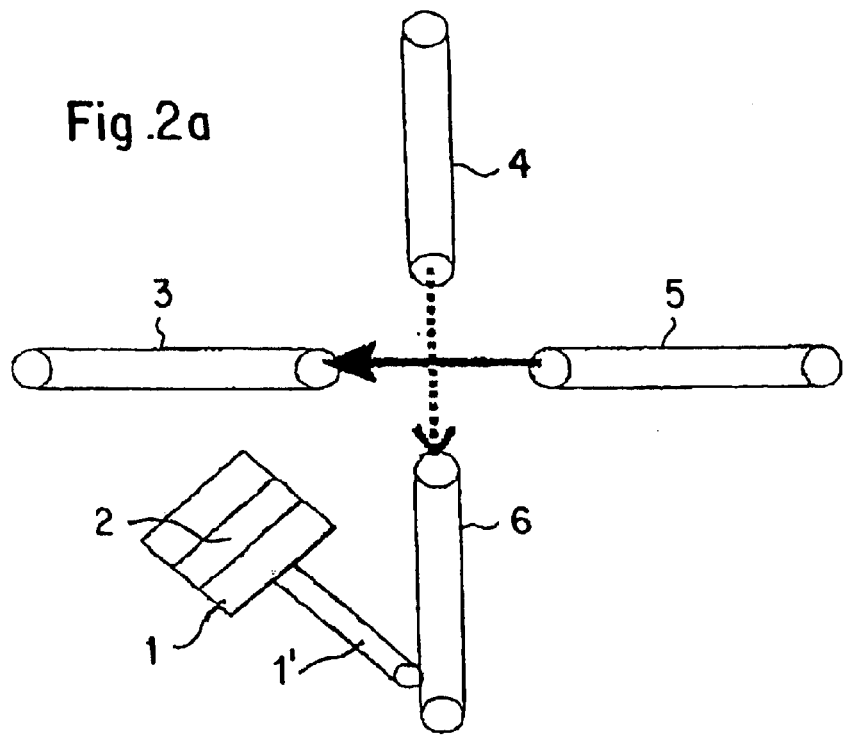
FIGS. 2a and 2b are possible operating positions of a switch of the above-mentioned type in a crossing switching area of mutually adjacent light-guiding optical fibers.
Figure 2B:
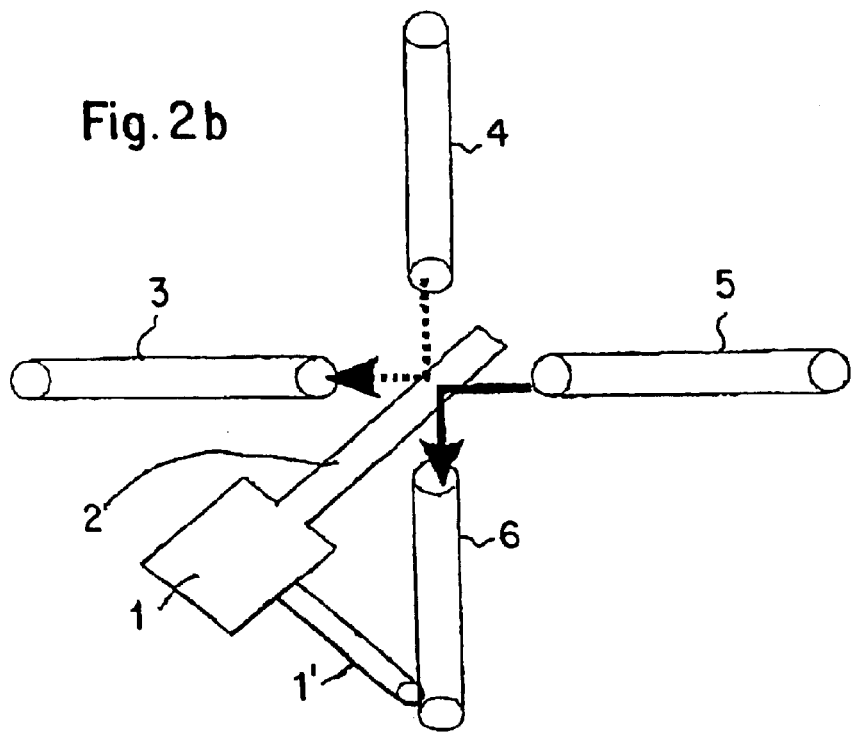

FIGS. 2a and 2b are schematic views of two possible switching positions of a switch according to FIG. 1a in the optical switching range of light-guiding optical fibers 3 to 6 which extend crosswise toward one another, in which case such switching possibilities can also be used for a switch according to the invention.

In FIG. 2a, the switch has no switching function. The switch is swivelled about its rotating shaft 1' such that the mirror element 2 (with its mirror surfaces 2' and 2" which are not shown in detail) projects upward in the drawing and is not swivelled into the crossing area of the fibers 3 to 6 and therefore exercises no reflective function. As a result, for example, the light from fiber 4 can enter unhindered into fiber 6 and the light from fiber 5 can enter unhindered into fiber 3.

In FIG. 2b, the switch is shown in the switching function. The mirror element 2 is now swivelled into the crossing area of the fibers 3 to 6. As a result, the light exiting from fiber 4 is now reflected and deflected into fiber 3, and the light from Fiber 5 is reflected and deflected into fiber 6. An optical switching operation has therefore taken place.

Figure 3A:
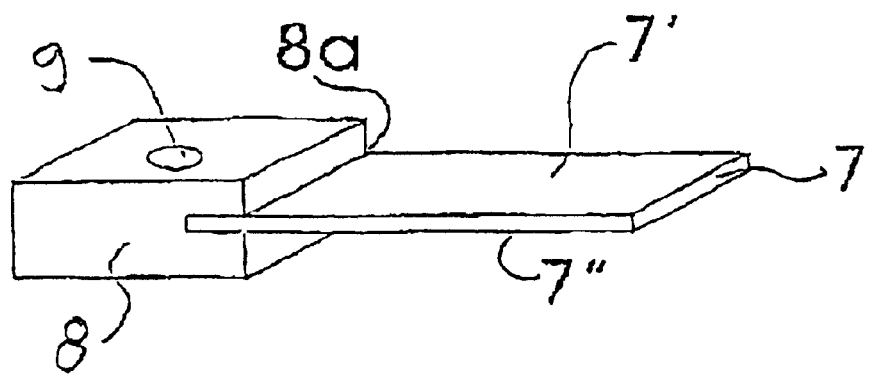
FIG. 3a is a perspective schematic view of a first embodiment of a switch according to the invention.
Figure 3B:
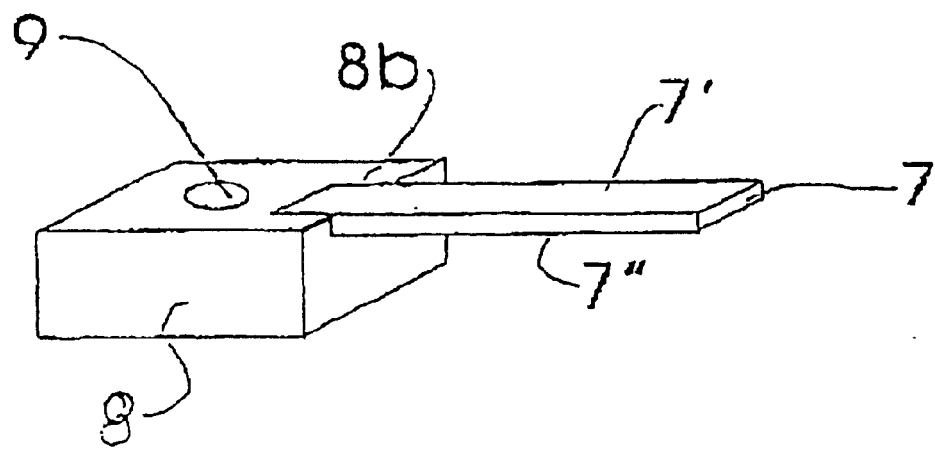
FIG. 3b is a perspective schematic view of a second embodiment of a switch according to the invention.

FIGS. 3a and 3b are schematic perspective views of embodiments of a switch according to the invention. In contrast to FIGS. 1a and 1b, it can clearly be recognized that the mirror elements 7 with their reflective surfaces 7' and 7" are now produced separately in an optically optimized manner and are connected with the also separate switch body 8 produced in a mechanically optimized manner. For this purpose, in the embodiment according to FIG. 3a, the mirror element 7 is form-lockingly introduced into a slot 8a. In the embodiment according to FIG. 3b, the mirror element 7 is introduced into a recess 8b such that it closes off flush with the surface of the switch body 8.

The switch body 8 is in each case constructed in an essentially cuboid shape and has a shaft bore 9 in the illustrated embodiments.

Figure 4A:
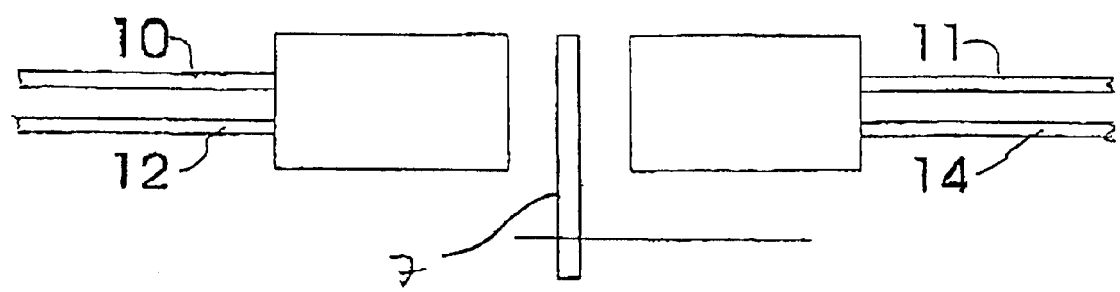
FIGS. 4a and 4b are views of a mirror element according to the invention in possible switching positions in the area of mutually adjacent light-guiding optical fibers.
Figure 4B:
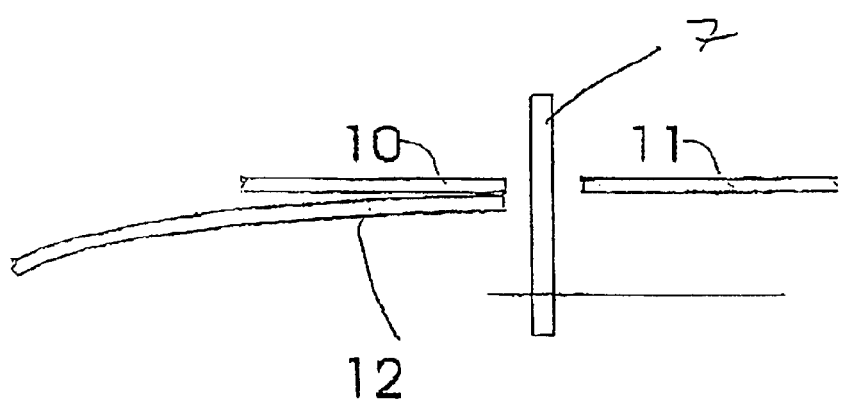

FIGS. 4a and 4b show examples of the mirror element 7 according to the embodiments of FIGS. 3a and 3b in possible optical switching applications.

FIG. 4a outlines a simple switch. As a function of the switch position, the light of the fibers 10, 12 either enters the fibers 11 and 14, specifically when the mirror element is not in the switching position, or the light is reflected back into the respective fiber when the mirror element 7 is in the illustrated switching position.

Correspondingly, as a function of the position of the switch, the light in FIG. 4b enters from fiber 10 either into fiber 11 or into fiber 12, in the latter case, the light signal from fiber 11 being reflected back into it.

Figure 5A:
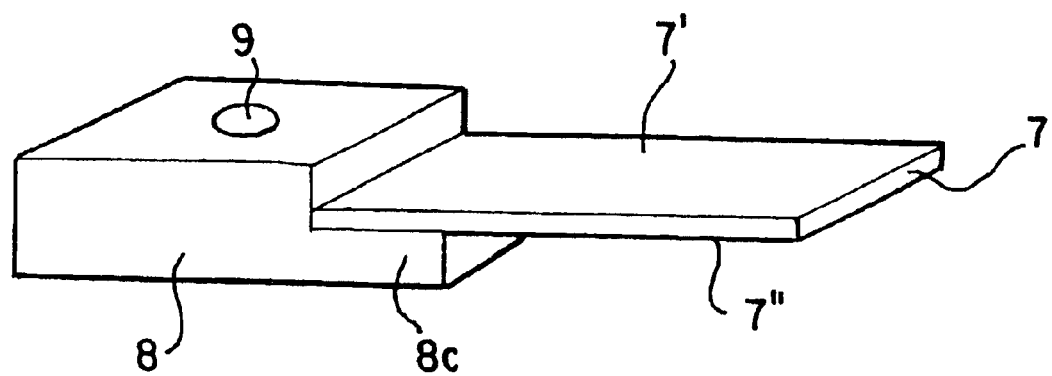
FIGS. 5a and 5b are perspective views of another embodiment.
Figure 5B:
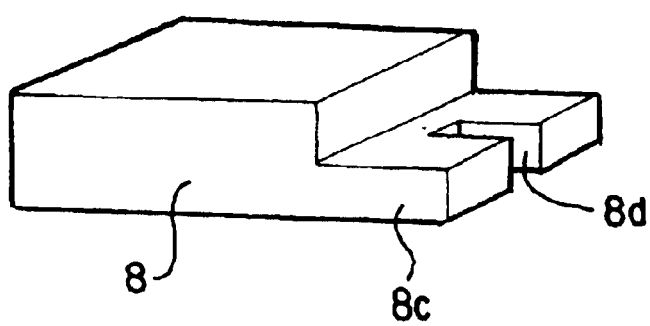

Another embodiment is outlined in FIG. 5a. FIG. 5b shows the switch body 8 which contains a recess 8d permitting a gluing-together, while glue does not reach the effective surface. In another embodiment according to FIG. 3a, instead of a slot 8a, a projecting shoulder 8c is provided on the switch body 8, on which the mirror element 7 is arranged and in which a recess 8d is formed, which is provided here as a slot.

Arbitrary combinations or variations of the arrangements outlined only as examples in FIGS. 4a and 4b are conceivable. In all cases, the deficiency of luminous power, which is to be kept as low as possible and which is connected with the insertion of the switch, is related to the spacing of the fibers 10 to 14, specifically such that, the smaller the spacing of the fibers, the lower the light deficiencies. The mirror element 7 can be produced in a particularly thin manner essentially from a glass body or a glass plate, so that the mutual spacing of the fibers can also be kept very low. For reasons of clarity only, the spacing between the fibers is exaggerated with respect to its largeness in FIGS. 5a and 4b.

What is claimed is:

1. A switch for optical switching of a light path entering a fiber-optical light guide, said switch comprising;

a glass body support having a first major surface and a second major surface with said first and second major surfaces being on opposite sides of said support and each of said first and second major surfaces being equipped with a respective reflective layer for establishing a respective mirror surface;

a swiveling switch body comprising a slot or shoulder for receiving said glass body support wherein said glass body support is arranged on said swiveling switch body.

2. Switch according to claim 1, wherein a mirror element comprising the at least one mirror surface and the glass body is cut of a glass plate provided with reflective layers.

3. Switch according to claim 2, wherein the reflective layers are applied to the support by means of a vacuum coating method.

4. Switch according to claim 1, wherein the glass body has a thickness of approximately 0.02 to 0.7 mm.

5. Switch according claim 1, wherein the reflective layers are applied to the support by means of a vacuum coating method.

6. Switch according to claim 1, wherein the reflective layers are each constructed as a highly reflective layer.

7. Switch according to claim 1, wherein the reflective layers are each protected by a protective layer.

8. Switch according to claim 7, wherein the protective layer is essentially formed of $SiO_2$, $SiO_x$, $MgF_2$, $ThF_4$ or similar stable hard dielectric oxides, nitrides or fluorides.

9. Switch according to claim 7, wherein the protective layer is produced by a vacuum technique.

10. Switch according to claim 1, wherein the switch body is produced from a material which is cast or injection molded.

11. Switch according to claim 1, wherein the support is arranged on an essentially cuboid-shaped switch body in a surface-flush manner in a recess.

12. Switch according to claim 1, wherein the support is glued to the switch body.

13. Switch according to claim 1, wherein the glass body a thickness of approximately 0.02 to 0.7 mm.

14. Switch according to claim 6, wherein each highly reflective layer is made of Au, Ag or Al.

15. A switch for optical switching of a light path entering a fiber-optical light guide, said switch comprising;

a glass body support having a first major surface and a second major surface with said first and second major surfaces being on opposite sides of said support and each of said first and second major surfaces being equipped with a respective reflective layer for establishing a respective mirror surface;

a swiveling switch body wherein said glass body support is arranged on said swiveling switch body and wherein the glass body support is inserted into a slot of said switch body approximately at a level of medium depth.

16. Switch according to claim 15, wherein the support is inserted in a form closure manner.

17. A switch for optical switching of a light path entering a fiber-optical light guide, said switch comprising;

a glass body support having a first major surface and a second major surface with said first and second major surfaces being on opposite sides of said support and each of said first and second major services being equipped with a respective reflective layer for establishing a respective mirror surface;

a swiveling switch body wherein said glass body support is arranged on said swiveling switch body and wherein the glass body support projects from the switch body approximately in the manner of a lug.

18. A switch for optical switching of a light path entering a fiber-optical light guide, said switch comprising;

a glass body support having a first major surface and a second major surface with said first and second major surfaces being on opposite sides of said support and each of said first and second major surfaces being equipped with a respective reflective layer for establishing a respective mirror surface;

a swiveling switch body comprising a slot or shoulder for receiving said glass body support wherein said glass body support is arranged on said swiveling switch body and wherein said glass body having said two mirror surfaces is cut out of a glass plate.

19. Switch according to claim 18, wherein the reflective layers are each constructed as a highly reflective layer.

20. Switch according to claim 18, wherein the reflective layers are each protected by a protective layer.

21. Switch according to claim 19, wherein the each highly reflective layer is made of Au, Ag or Al.

22. A switch for optical switching of a light path entering a fiber-optical light guide, said switch comprising;

a glass body support having a first major surface and a second major surface with said first and second major surfaces being on opposite sides of said support, and each of said first and second major surfaces being equipped with a respective reflective layer for establishing a respective mirror surface;

a swiveling switch body comprising a slot or shoulder for receiving said glass body support wherein said glass body support is arranged on said swiveling switch body and wherein the glass body has a thickness of approximately 0.02 to 0.7 mm.

23. A method of making a switch for optical switching of a light path entering a fiber-optical light guide, said switch comprising;

a glass body support having a first major surface and a second major surface with said first and second major surfaces being on opposite sides of said support and each of said first and second major surfaces being equipped with a respect reflective layer for establishing a respective mirror surface; and a swiveling switch body comprising a slot or shoulder for receiving said glass body support wherein said glass body support is arranged on said swiveling switch body, said method comprising;

forming the support by cutting a glass body out of glass plate provided with two reflective layers; and arranging said support on said swiveling switch body.

24. A method of making a switch according to claim 23, wherein the glass body has a thickness of between 0.02 mm and 0.7 mm.

25. A method of making a switch according to claim 24, wherein the glass body has a thickness of between 0.1 mm and 0.5 mm.

26. A method of making a switch according to claim 23, wherein the reflective layers are each constructed as a highly reflective layer.

27. A method of making a switch according to claim 26, wherein the reflective layers are each protected by a protective layer.

28. A method of making a switch according to claim 27, wherein the protective layer is essentially formed in $SiO_2$, $SiO_x$, $MgF_2$, $ThF_4$ or similar stable hard dielectric oxides, nitrides or fluorides.

29. The method according to claim 26, wherein each highly reflective layer is made of Au, Ag or Al.

30. A switch according to claim 23, wherein the support is inserted in a form closure emanner.

31. Switch for the optical switching of a light path, particularly for switching the entering of light into a fiber-optical light guide, the switch having at least one mirror surface for reflecting the light, a support being equipped with a reflective layer for establishing the mirror surface, wherein the support is a glass body, wherein the at least one mirror surface for reflecting the light is arranged on a swiveling switch body, and wherein the support is inserted into a slot of an essentially cuboid-shaped switch body approximately at a level of medium deepness.

* * * * *